United States Patent [19]
Murphy

[11] 3,863,551

[45] Feb. 4, 1975

[54] TUBULAR ARTICLE FORMING APPARATUS

[75] Inventor: Robert H. Murphy, West Hartford, Conn.

[73] Assignee: The Wiremold Company, West Hartford, Conn.

[22] Filed: Jan. 9, 1974

[21] Appl. No.: 431,688

[52] U.S. Cl.................. 93/80, 29/477.3, 156/195, 308/DIG. 1
[51] Int. Cl............................................ B31c 1/00
[58] Field of Search .................. 72/49, 50, 63, 148; 156/195, 428, 429; 93/80, 94 R; 29/477.3, 477.7, 200 B; 308/DIG. 1

[56] References Cited
UNITED STATES PATENTS
3,548,724  12/1970  Hall ........................................ 93/80
3,580,461  5/1971  Dobell .............................. 29/477.7

*Primary Examiner*—C. W. Lanham
*Assistant Examiner*—Robert M. Rogers
*Attorney, Agent, or Firm*—Prutzman, Hayes, Kalb & Chilton

[57] ABSTRACT

Tubular article forming apparatus having a mandrel assembly with a fixed tubular support mandrel with a peripheral helical groove and an internal helically extending air pressure plenum underlying the peripheral groove and connected thereto by radial air passages and an idler support belt extending helically around the tubular support mandrel within the peripheral groove and supported therein by an underlying air cushion provided by air from the plenum, and a drive belt mechanism with an outer drive belt extending helically around the mandrel assembly over the support belt and cooperating therewith to draw tubular article forming material onto and helically around the mandrel assembly and feed a tubular article thereby formed helically forwardly off the mandrel.

8 Claims, 4 Drawing Figures

3,863,551

TUBULAR ARTICLE FORMING APPARATUS

BRIEF SUMMARY OF THE INVENTION

The present invention relates generally to apparatus for manufacturing tubular articles of elongated helically wound material by feeding the material generally tangentially onto and then helically around and forwardly off the mandrel.

It is a principal aim of the present invention to provide a new and improved tubular article forming apparatus for feeding elongated tubular article material generally helically around a mandrel to form the tubular article.

It is another aim of the present invention to provide a new and improved mandrel assembly for tubular article forming apparatus for freely feeding the material around a helical path with reduced frictional resistance.

It is a further aim of the present invention to provide a new and improved mandrel assembly for tubular article forming apparatus which facilitates high speed low-cost production of tubular articles.

It is another aim of the present invention to provide a new and improved tubular article forming apparatus for feeding elongated tubular article material along a helical path without undesirable material distortion.

Other objects will be in part obvious and in part pointed out more in detail hereinafter.

A better understanding of the invention will be obtained from the following detailed description and the accompanying drawings of an illustrative application of the invention.

DESCRIPTION OF THE PREFERRED EMBODIMENT

Figure 1:
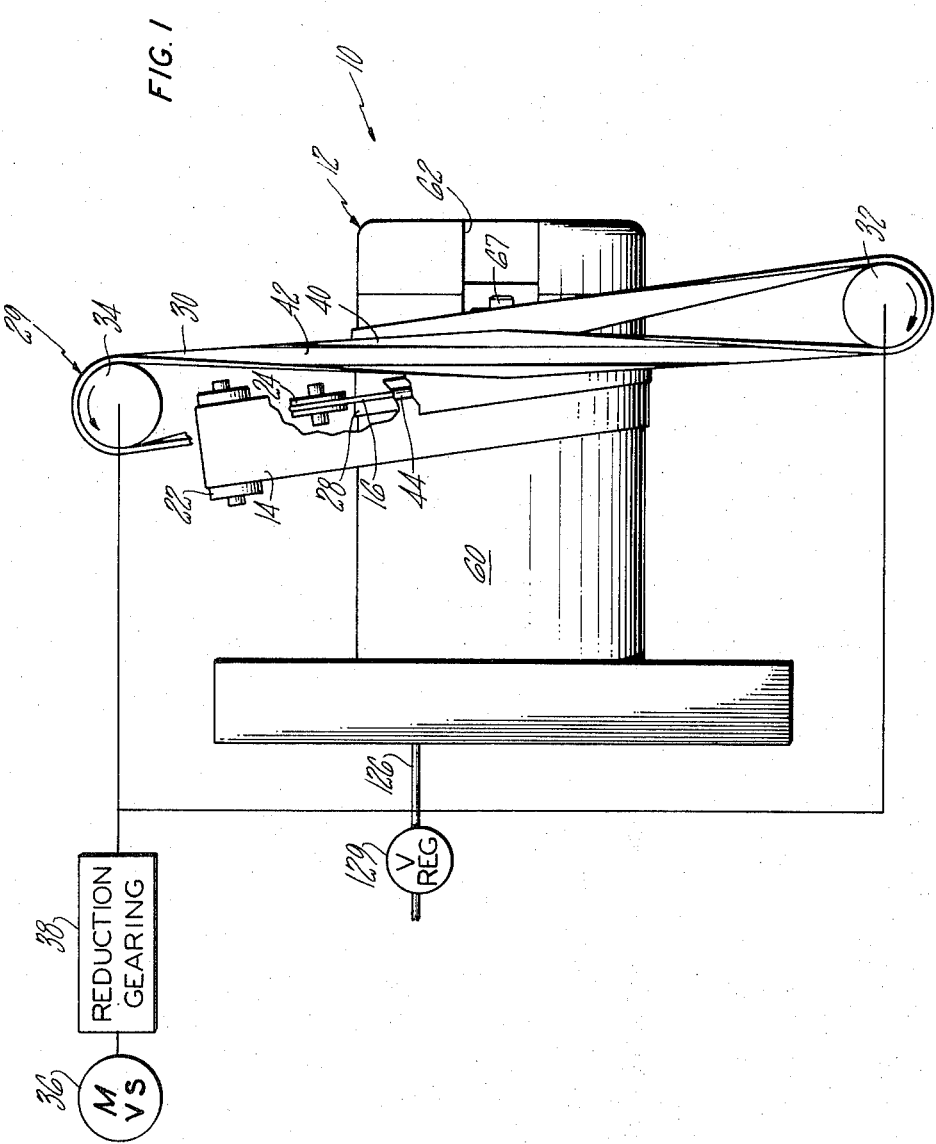
FIG. 1 is a partly diagrammatic and partly schematic view, partly broken away, of a tubular article forming apparatus incorporating an embodiment of the present invention.
Figure 2:
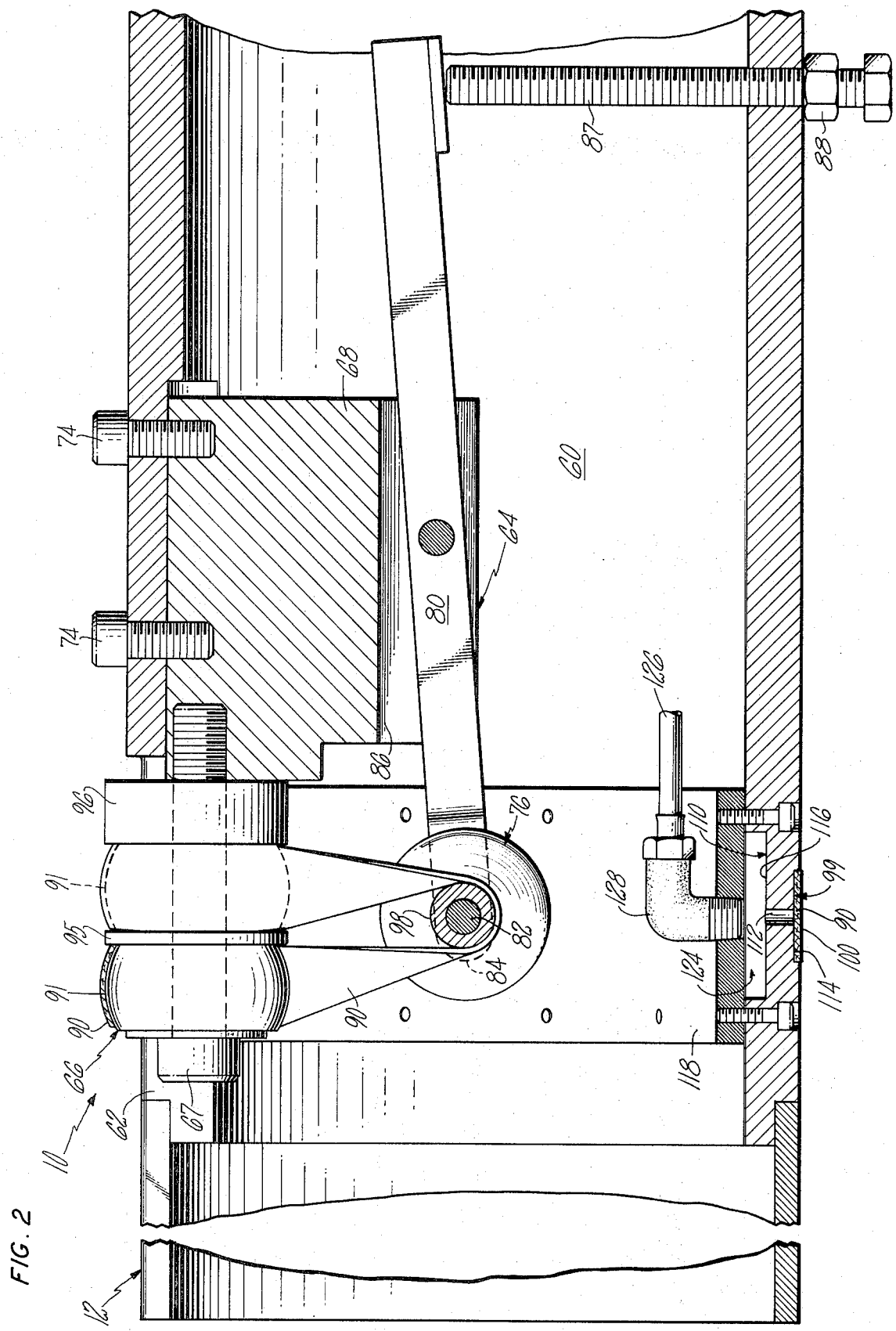
FIG. 2 is an enlarged partial longitudinal section view, partly broken away and partly in section, of a mandrel assembly of the tubular article forming apparatus.
Figure 3:
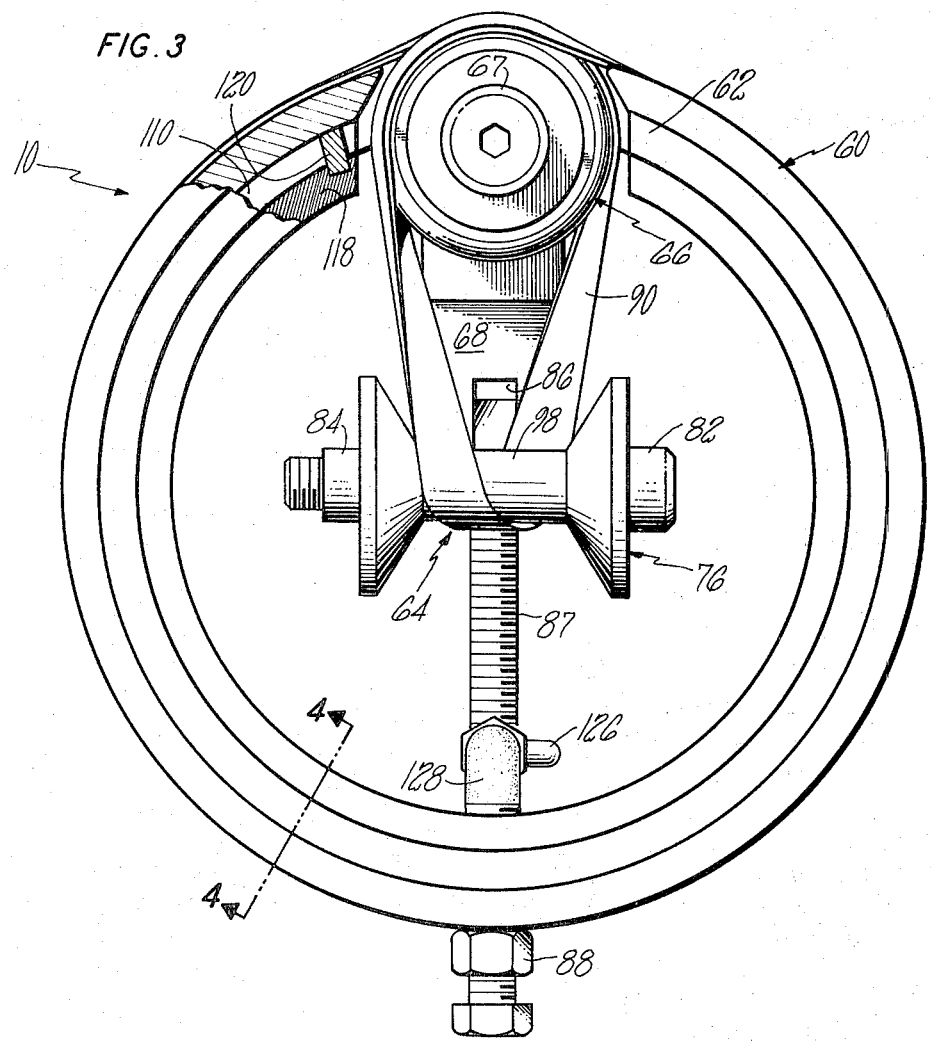
FIG. 3 is an enlarged front end view, partly broken away and partly in section, of the mandrel assembly.
Figure 4:
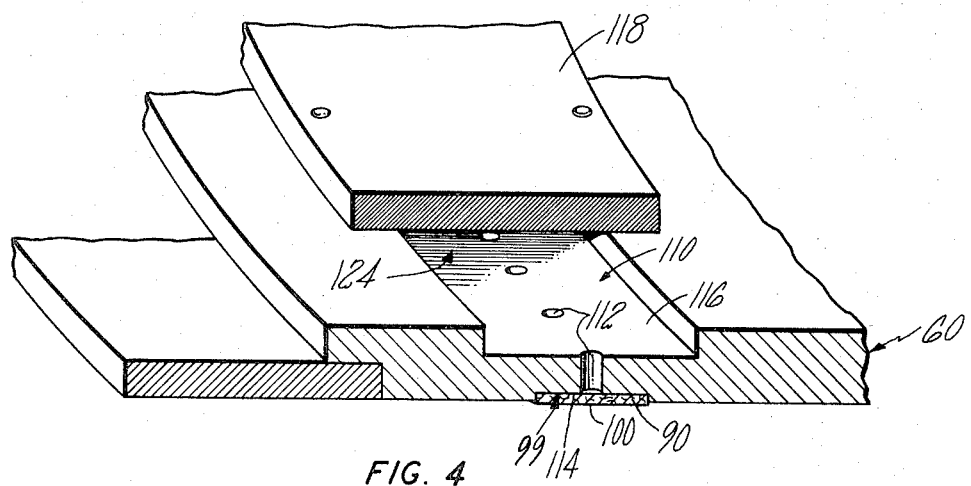
FIG. 4 is an enlarged partial perspective view, partly broken away and partly in section, of a section of the mandrel assembly taken generally at line 4—4 of FIG. 3.

Referring now to the drawings in detail wherein like numerals designate like parts, a tubular article forming apparatus 10 incorporating an embodiment of the present invention is shown to be generally of the type shown and described in U.S. Pat. application Ser. No. 396,529 of Norman J. Perusse et al., entitled "Tubular Article Forming Apparatus" and filed Sept. 12, 1973. More particularly, the tubular article forming apparatus comprises a tube forming mandrel assembly 12 for receiving elongated web and reinforcing wire material 14, 16 respectively. The web material 14 is fed tangentially to the mandrel assembly 12 from a suitable rotatable supply roll (not shown) via a rotatable guide roll 22. The reinforcing wire material 16 is similarly fed tangentially to the mandrel assembly 12 from a suitable rotatable supply roll (not shown) via a rotatable guide roll 24. The web 14 and reinforcing wire 16 are fed onto the mandrel assembly 12 at substantially the same linear rate and at substantially the same acute angle to the longitudinal axis of the mandrel assembly 12 such that the web and wire material are fed together tangentially to the mandrel assembly 12 and then helically around the mandrel assembly 12 to form a tubular article. The web 14 is wider than the pitch of the helical path of the web and wire material such that each succeeding wrap of web 14 overlaps the preceding wrap. The reinforcing wire 16 is fed onto the preceding helical wrap of web 14 adjacent its trailing edge 28 and underneath the succeeding wrap of web 14 adjacent its leading edge and such that a suitable intermediate web and wire sandwich construction is formed. The web 14 is preferably suitably treated, for example by applying strips of a suitable adhesive (not shown) onto the trailing edge of the web as it is fed to the mandrel assembly 12 whereby the engaging overlapping portions of web on both sides of the reinforcing wire 16 quickly adhere together to complete the tubular article which is then fed forwardly off the mandrel assembly 12 and cut into suitable lengths as desired.

An external drive belt assembly 29 is employed for assisting in firmly feeding the web and wire material onto the mandrel assembly 12. The external drive belt assembly 29 comprises an overlying endless drive belt 30 and a pair of drive pulleys 32, 34 driven together by a suitable variable speed motor 36 through reduction gearing 38. The drive pulleys 32, 34 are suitably mounted above and on opposite sides of the mandrel assembly 12 and the drive belt 30 extends partly around the pulleys 32, 34 and once around the intermediate mandrel assembly 12. More particularly, the drive belt 30 passes from the drive pulley 34 to the mandrel assembly 12 and then helically over and around the mandrel assembly 12 at substantially the same pitch angle as the web and wire material and then to the drive pulley 32 and back to the drive pulley 34. The drive belt 30 is therefore driven along a helical path around the mandrel assembly 12 and such that the drive belt 30 remains in engagement with the web and wire material for substantially one full turn. As can be seen in FIG. 1, the drive belt 30 passes generally centrally over the reinforcing wire 16 and engages the adjacent overlapping edge portions of the successive wraps of web 14. Also, the inner or working face 40 of the drive belt 30 may have a central groove 42 contoured to receive the reinforcing wire 16 and thereby assist in forming with the reinforcing wire 16 a helical ridge 44 around the formed tubular article and such that the outer portions of the working face 40 of the drive belt 30 press the overlapping web portions together. The drive belt 30 is made suitably taut to ensure that the overlapping web portions are firmly held in engagement to be integrally secured together as the web and wire material is helically fed around the mandrel assembly 12.

The mandrel assembly 12 comprises a fixed generally cylindrical tubular support mandrel 60 having an axially extending slot 62 adjacent its forward end and a support belt mechanism 64 mounted on the support mandrel 60 for cooperation with the drive belt 30 to support the web and reinforcing wire material as it is fed helically around the support mandrel 60. The support belt mechanism 64 comprises an axially extending outer roll 66 mounted on the tubular support mandrel 60 within the slot 62 and with its axis extending parallel to the axis of the support mandrel 60. The outer roll 66 is shown rotatably mounted on a fixed support pin 67 extending axially forwardly from a mounting block 68 suitably secured within the tubular support mandrel 60 as by threaded fasteners 74. A second transversely extending roll 76 is mounted within the tubular support mandrel 60 generally centrally below the outer roll 66. The inner roll 76 is shown rotatably mounted on a support pin 82 affixed to an offset end 84 of a lever 80, and the lever 80 is pivotally mounted within a lower axially extending slot 86 in the mounting block 68. The axis of the inner roll 76 is shown perpendicular to the axis of the outer roll 66. An adjustment screw 87 threaded through the bottom of the tubular support mandrel 60 engages the rear end of the lever 80 and is adjustable to radially position the inner roll 76 relatively to the outer roll 66. A lock nut 88 is provided for locking the adjustment screw in its adjusted position.

A flat endless idler support belt or band 90 is mounted to extend helically around the support mandrel 60 for generally one full wrap directly below the outer helical wrap of the drive belt 30 and such that the helically extending web and wire material are supported therebetween. The endless idler support belt 90 passes from the support mandrel 60 over and down one side of the outer roll 66, around the underside of the inner roll 76 and upwardly and over the other side of the outer roll 66 and onto and helically around the support mandrel 60. The outer roll 66 is mounted such that its support belt guide surfaces 91 are slightly outwardly of the annular belt supporting surface of the support mandrel 60 and so that the endless support belt 90 passes tangentially to and from the support mandrel 60. The belt guide surfaces 91 of the outer roll 66 are axially spaced and are convex or partly spherical to assist in accurately maintaining the helical path of the support belt 90 about the support mandrel 60. Also, a spacer flange 95 intermediate the axially spaced convex guide surfaces 91 and a rear spacer flange 96 provide for assisting in guiding the support belt 90 against axial displacement on the guide roll 66. The inner guide roll 76 provides for guiding and axially returning the support belt 90 from the forward end to the rearward end of its generally helical path where it commences its helical movement about the mandrel 60. In addition, the diameter of the center section 98 of the inner guide roll 76 is selected in accordance with the desired helical pitch of the support belt 90 which should be substantially equal to the helical pitch of the overlying drive belt 30 and the helical pitch of the web and wire material of the formed tubular article.

The drive belt 30 and support belt 90 cooperate to firmly draw the web and wire material onto the mandrel assembly, and the web and wire material are preferably suitably restrained for feeding the material to the mandrel under slight tension and for pressing the overlapping portions of the web material in firm engagement for bonding them together.

In accordance with the present invention, the support mandrel 60 is formed with an outer peripheral helical slot 99 for receiving the support belt 90. The helical slot 99 has a substantially constant rectangular cross section with a width approximately equal to but slightly greater than the width of the belt 90 and a highth preferably slightly less than the thickness of the belt or band 90. Thus, the diameter of the outer support face 100 of the helical portion of the support belt 90 is slightly greater than the outer diameter of the support mandrel 60, and the formed tubular article is therefore free to be fed forwardly off the mandrel with minimum frictional resistance. In addition, as the outer guide roll 66 is positioned such that its outer surfaces 91 extend slightly radially outwardly beyond the belt supporting surface of the support mandrel 60, the inside diameter of the formed tubular article will be slightly greater than the diameter of the helical portion of the belt support face 100 to further facilitate in feeding the tubular article forwardly off the mandrel assembly 12. Thus, the web and wire material do not contact and are therefore not frictionally restrained by the outer cylindrical surface of the fixed support mandrel 60 during the forming process.

The tubular support mandrel 60 is formed with an inner helical slot 110 directly underlying the outer peripheral helical slot 99, and a plurality of angularly spaced radially extending air passageways or apertures 112 are provided in the tubular support mandrel 60 between the inner adjacent faces 114, 116 of the helical slots 99, 110 respectively.

The inner helical slot 110 is enclosed by a helically extending cover plate 118 and end plugs 120 to provide an enclosed air pressure plenum 124. An air inlet conduit 126 having an inlet fitting 128 threaded into the cover plate 118 is connected via a suitable pressure regulator 129 to a suitable air pressure source (not shown) such that a relatively constant air pressure is maintained in the air plenum 124. Air pressure is thereby supplied to the underside of the support belt 90 via the plenum 124 and radial apertures 112 to provide a pressurized air cushion underneath the belt 90 for which purpose the belt 90 is preferably made substantially imperforate. The belt is thereby radially supported substantially frictionlessly very slightly above the inner face 114 of its supporting slot 99. The inner roll 76 is radially adjusted to establish the desired belt tension and so that the belt 90 feeds helically around the slot 99 of the support mandrel slightly above the inner face 114 of the slot 99. The supporting air cushion underneath the belt 90 preferably leaks slightly around both edges of the belt 90 to provide an additional lateral air cushion between the edges of the belt and the sides of its supporting slot to provide extremely low frictional resistance between the moving belt 90 and the non-rotatable mandrel 60.

The angularly spaced radial air apertures 112 are provided along substantially the entire length of the helical support slot 99 to provide a substantially constant air pressure cushion under the belt 90. However, the air apertures 112 are not provided at the ends of the helical slot 99 under the portions of the endless belt 90 extending between the outer roll 66 and the tangential entry and exit points of the endless belt 90 onto and off of the mandrel 60 where the belt 90 is spaced from the inner slot face 114 and therefore where the air cushion support is not useful.

The foregoing design can be made in any appropriate size to form tubular articles of any desired size. The employed tubular article material is firmly and substantially positively drawn onto the mandrel assembly and fed helically around the mandrel assembly without an undesirable material distortion and such that the tubular article can be formed in one turn and then fed forwardly off the mandrel assembly. The support belt 90 supports the material so there is substantially no frictional resistance between the tubular article material and the fixed mandrel 60, and the air cushion supports the support belt 90 so that there is very little frictional resistance between the support belt 90 and mandrel 60. Consequently, the tubular article forming apparatus is useful for producing tubular articles at high speed and therefore at low cost per unit length, and the web material does not need to be lined or internally treated in any manner to facilitate feeding the tubular article material around and forwardly off the mandrel.

As will be apparent to persons skilled in the art, various modifications, adaptations and variations of the foregoing specific disclosure can be made without departing from the teachings of the present invention.

I claim:

1. In a tubular article forming apparatus for forming a tubular article of elongated generally helically coiled material and having a mandrel assembly for supporting the material for forward movement along a generally helical path therearound for helically coiling the material into a tubular article, the mandrel assembly comprising an internal endless support belt for internally supporting the tubular article material, a support mandrel supporting the support belt for forward generally helical movement around the support mandrel along a generally helical path thereof from a first rearward point to a second forward point, and guide means for supporting and guiding the endless support belt from the forward to the rearward point of its helical path, the guide means and support mandrel supporting the endless support belt for unimpeded continuous movement generally helically around the support mandrel for supporting said material for forward movement along its generally helical path around the mandrel assembly, the improvement wherein the support mandrel has a generally helical peripheral support surface supporting the endless support belt along its said helical path, an air pressure supply system for supplying air under pressure, and air passageway means connecting the air pressure supply system to immediately above the helical peripheral support surface and under the support belt for supplying air under pressure as an air cushion under the support belt.

2. A tubular article forming apparatus according to claim 1 wherein the support mandrel has a generally helical peripheral slot receiving the endless support belt along its helical path and having an inner helical surface providing said helical peripheral support surface.

3. A tubular article forming apparatus according to claim 1 wherein the guide means comprises generally axially extending outer rotatably roll means having belt guide surfaces for guiding the support belt tangentially to and from its path of generally helical movement whereby the support belt passes tangentially from the forward point of its helical path over and down one side of the outer roll means and passes up the other side and over the outer roll means tangentially to the rear point of its helical path.

4. A tubular article forming apparatus according to claim 1 wherein the guide means comprises a first axially extending rotatable outer roll with an outer guide roll surface adjacent said path of generally helical movement of the support belt and a second transversely extending rotatable inner roll and wherein the endless support belt passes forwardly over and down one side of the outer roll, under the inner roll and up the other side and over the outer roll, and further comprising adjustment means for adjusting the inner roll relative to the outer roll for adjusting the thickness of the air cushion under the support belt.

5. A tubular article forming apparatus according to claim 1 wherein the support belt is an idler belt.

6. A tubular article forming apparatus according to claim 1 wherein the air pressure supply system comprises enclosure means providing an air pressure plenum internally of said generally helical path of said material and connected to the air passageway means for supplying air under pressure as an air cushion under the support belt.

7. A tubular article forming apparatus according to claim 6 wherein said enclosure means forms a generally helical passageway internally of and underlying the helical peripheral support surface and wherein the air passageway means comprises a plurality of generally radially extending air conduits between the helical passageway and said helical peripheral support surface.

8. A tubular article forming apparatus according to claim 6 wherein the support mandrel is tubular and the enclosure means provides an angularly extending air plenum on the inside of the support mandrel underlying said helical peripheral support surface.

* * * * *